(12) United States Patent
Fafri et al.

(10) Patent No.: US 9,009,095 B1
(45) Date of Patent: Apr. 14, 2015

(54) METHOD AND SYSTEM FOR UTILIZING MARKOV CHAIN MONTE CARLO SIMULATIONS

(75) Inventors: Mohsin Saleet Fafri, Potomac, MD (US); Tuan Minh Hoang-Trong, Manassas, VA (US); George Stuart Blair Williams, Waynesboro, VA (US)

(73) Assignee: George Mason University, Fairfax, VA (US)

( * ) Notice: Subject to any disclaimer, the term of this patent is extended or adjusted under 35 U.S.C. 154(b) by 614 days.

(21) Appl. No.: 13/005,433

(22) Filed: Jan. 12, 2011

Related U.S. Application Data

(60) Provisional application No. 61/294,194, filed on Jan. 12, 2010, provisional application No. 61/294,205, filed on Jan. 12, 2010.

(51) Int. Cl.
| | |
|---|---|
| *G06N 7/06* | (2006.01) |
| *G06F 9/44* | (2006.01) |
| *G06N 7/00* | (2006.01) |
| *G06F 19/00* | (2011.01) |

(52) U.S. Cl.
CPC ............ *G06N 7/005* (2013.01); *G06F 19/3437* (2013.01)

(58) Field of Classification Search
CPC ............................ G06N 7/005; G06F 19/3437
See application file for complete search history.

(56) References Cited

U.S. PATENT DOCUMENTS

| | | | |
|---|---|---|---|
| 2004/0010399 A1* | 1/2004 | Kadane et al. ................ | 703/2 |
| 2006/0129367 A1* | 6/2006 | Mishra et al. ................ | 703/13 |
| 2009/0144218 A1* | 6/2009 | Bonawitz et al. ............ | 706/52 |
| 2010/0232299 A1* | 9/2010 | Conway ...................... | 370/242 |

OTHER PUBLICATIONS

Bell et al, Distributed disk-based algorithms for model checking very large Markov chains, 2006.*
Ball et al, Bayesian Interference for Ion-Channel Gating Mechanisms Directly from Single-Channel Recordings, Using Markov Chain Monte Carlo, 1999.*
Ball et al, Superposition of Spatially Interacting Aggregated Continuous Time Markov Chains, 2000.*
D. Bers et al., "Ratio to Ryanodine to dihydropyridine receptors in cardiac and skeletal muscle and implications for E-C Coupling", Am. J. Physiol, vol. 264, pp. C1587-C1593 (1993).
R. Bertram et al., "Population Dynamics of Synaptic Release Sites", SIAM J. Appl. Math., vol. 58, pp. 142-169 (1998).

(Continued)

*Primary Examiner* — Alan Chen
*Assistant Examiner* — Mikayla Chubb
(74) *Attorney, Agent, or Firm* — DLA Piper LLP US

(57) ABSTRACT

Systems and methods for determining a probability of changing from one state to another in a stochastic entity, comprising: determining the compact component matrix utilizing characteristic information of the stochastic entity; determining the compact composite component matrix by taking a Kroneker product of the compact component matrix and an identity matrix; determining and placing all current states for the stochastic entity into a state space matrix; determining a Q matrix and/or a transition rate matrix using the compact composite component matrix and basic conditions or variables of the problem domain and/or a compact transition rate matrix; and performing Markov chain Monte Carlo (MCMC) simulation using information from the state space matrix and information from the transition rate matrix to determine the probability of changing from one state to another state in the stochastic entity.

26 Claims, 5 Drawing Sheets

(56) References Cited

OTHER PUBLICATIONS

Vladimir E. Bondarenko et al., "A Model of Graded Calcium Release and L-Type $Ca^{2+}$Channel Inactivation in Cardiac Muscle", Am. J. Physiol. Heart Circ. Physiol., vol. 286, pp. H154-H1169 (2004).

H. Cheng et al., "Calcium Sparks: Elementary Events Underlying Excitation-Contraction Coupling in Heart Muscle", Science, vol. 262, pp. 740-744. Oct. 29, 1993.

Jerald Curran et al., "β-Adrenergic Enhancement of Sarcoplasmic Reticulum Calcium Leak in Cardiac Myocytes is Mediated by Calcium/Calmodulin-Dependent Protein Kinase", Circulation Research, vol. 100 pp. 391-398, Feb. 16, 2007.

Joseph L. Greenstein et al., "An Integrative Model of the Cardiac Ventricular Myocyte Incorporating Local Control of Ca2+ Release", Biophysical Journal, vol. 83, pp. 2918-2945, Dec. 2002.

Joseph L. Greenstein et al., "Modeling the Actions of β-Adrenergic Signaling on Excitation-Contraction Coupling Processes", Ann. NY Acad. Sci, vol. 1015, pp. 16-27, May 2004.

Joseph L. Greenstein et al., "Mechanisms of Excitation-contraction Coupling in an Integrative Model of the Cardiac Ventricular Myocyte" Biophysical Journal, vol. 90, pp. 77-91, Jan. 2006.

Joseph L. Greenstein et al., "Role of the Calcium-Independent Transient Outward Current/$_{to1}$ in Shaping Action Potential Morphology and Duration", Circulation Research, vol. 87, pp. 1026-1033, Nov. 24, 2000.

Yasmin L. Hashambhoy et al., "CaMKII-Induced Shift in Modal Gating Explains L-Type $Ca^{2+}$Current Facilitation: A Modeling Study", Biophysical Journal, vol. 96, pp. 1770-1785, Mar. 2009.

R. Hinch at al., "Multi-Scale Models of Local Control of Calcium Induced Calcium Release", Progress in Biophysics and molecular Biology, vol. 90, pp. 136-150 (2006).

R. Hinch et al , "A Simplified Local Control Model of Calcium-Induced Calcium Release in Cardiac Ventricular Myocytes", Biophysical Journal, vol. 87, pp. 3723-3736, Dec. 2004.

Ion A. Hobai et al., "Decreased Sarcoplasmic Reticulum Calcium Content is Responsible for Defective Excitation-Contraction Coupling in Canine Heart Failure", Circulation, vol. 103, pp. 1577-1584, Mar. 20, 2001.

John P. Imredy et al., "Mechanism of $Ca^{2+}$-Sensitive Inactivation of L-Type $Ca^{2+}$Channels", Neuron, vol. of 12, pp. 1301-1318, Jun. 1994.

M. Saleet Jafri et al., "Cardiac $Ca^{2+}$Dynamics: The Roles of Ryanodine Receptor Adaptation and Sarcoplasmic Reticulum Load", Biophysical Journal, vol. 74, pp. 1149-1168, Mar. 1998.

Joseph H. Levine et al., "Depression of Action Potential Characteristics and a Decreased Space Constant are Present in Postischemic, Reperfused Myocardium", J. Clin. Invest., vol. 79, pp. 107-116, Jan. 1987.

Klaus W. Linz et al., "Control of L-Type Calcium Current During the Action Potential of Guinea-Pig Ventricular Myocytes", Journal of Physiology, vol. 513.2, pp. 425-442 (1998).

Ching-Hsing Lou et al., "A Dynamic Model of the Cardiac Ventricular Action Potential>I, Simulation of Ionic Currents and Concentration Changes", Circulation Research, vol. 74, pp. 1071-1096, Jun. 1994.

Lars M. Maier at al., "Role of $Ca^{2+}$/Calmodulin-Dependent Protein Kinase (CaMK) in Excitation-Contraction Coupling in the Heart", Cardiovascular Research, vol. 73, pp. 631-640 (2007).

Reza Mazhari at al., "Molecular Interactions Between Two Long-QT Syndrome Gene Products, HERG and KCNE2, Rationalized by in Vitro and in Silico Analysis", Circulation Research, vol. 89, pp. 33-38, Jul. 6, 2001.

Peter Milberg et al., "Inhibition of the Na+/Ca2+ Exchanger Suppresses Torsades de Pointes in an Intact Heart Model of Long QT Syndrome-2 and Long QT Syndrome-3", Heart Rhytmn, vol. 5, No. 10, pp. 1444-1452, Oct. 2008.

Masahito Miura et al., "$Ca^{2+}$Waves During Triggered Propagated Contractions in Intact Trabeculae: Determinants of the Velocity of Propagation", Circulation Research, vol. 84, pp. 1459-1468, Jun. 25, 1999.

Brian O'Rourke et al., "Mechanisms of Altered Excitation-Contraction Coupling in Canine Tachycardia-Induced Heart Failure, I: Experimental Studies", Circulation Research, vol. 84, pp. 562-570, Mar. 19, 1999.

Blaize Z. Peterson et al., "Calmodulin is the $Ca^{2+}$Sensor for $Ca^{2+}$-Dependent Inactivation of L-Type Calcium Channels", Neuron, vol. 22, pp. 549-558, Mar. 1999.

V. Ramesh et al., "Structural Proximity of Mitochondria to Calcium Release Units in Rat Ventricular Myocardium May Suggest a Role in $Ca^{2+}$Sequestration", Annals of the New York Academy of Sciences, vol. 853, pp. 341-344, Sep. 1998.

J.J. Rice et al., "Modeling Short-Term Interval-Force Relations in Cardiac Muscle", Annals of the New York Academy of Sciences, vol. 853, pp. 345-349, Sep. 1998.

John J. Rice et al., "Modeling gain and gradedness of $Ca^{2+}$Release in the Functional Unit of the Cardiac Diadic Space", Biophysical Journal, vol. 77, pp. 1871-1884, Oct. 1999.

J. Jeremy Rice et al., "Modeling Short-Term Interval-Force Relations in Cardiac Muscle", Am. J. Physiol. Heart Circ. Physiol., vol. 278, pp. H913-H931 (2000).

Jeffrey J. Saucerman et al., "Mechanistic Systems Models of Cell Signaling Networks: A Case Study of Myocyte Adrenergic Regulation", Progress in Biophysics and Molecular Biology, vol. 85, pp. 261-278 (2004).

Jeffrey J. Saucerman et al., "Modeling β-Adrenergic Control of Cardiac Myocyte Contractility in Silico", The Journal of Biological Chemistry, vol. 278, No. 48 pp. 27997-48003, Nov. 28, 2003.

Eric A. Sobie et al., "Terminal of Cardiac $Ca^{2+}$Sparks: An Investigative Mathematical Model of Calcium-Induced Calcium Release": Biophysical Journal, vol. 83, pp. 59-78, Jul. 2002.

C. Soeller et al., "Application of Two-Photon Flash Photolysis to Reveal Intercellular Communication and Intracellular $Ca^{2+}$Movements", Journal of Biomedical Optics, vol. 8, No. 3, pp. 418-427, Jul. 2003.

Michael D. Stern, "Theory of Excitation-Contraction Coupling in Cardiac Muscle", Biophysical Journal, vol. 63, pp. 497-517, Aug. 1992.

Antti J. Tanskanen et al., "The Role of Stochastic and Modal Gating of Cardiac L-Type $Ca^{2+}$Channels on Early After-Depolarizations", Biophysical Journal, vol. 88, pp. 85-95, Jan. 2005.

Silvio Weidmann, "Electrical Constants of Trabecular Muscle From Mammalian Heart", J. Physiol, vol. 210, pp. 1041-1054 (1970).

Withrow Gil Wier et al., "Local Control of Excitation-Contraction Coupling in Rat Heart Cells", Journal of Physiology, vol. 474.3, pp. 463-471 (1994).

George S.B. Williams et al., "A Probability Density Approach to Modeling Local Control of Calcium-Induced Calcium Release in Cardiac Myocytes", Biophysical Journal, vol. 92, pp. 2311-2328, Apr. 2007.

George S.B. Williams et al., "Moment Closure for Local Control Models of Calcium-Induced Calcium Release in Cardiac Myocytes", Biophysical Journal, vol. 95, pp. 1689-1703, Aug. 2008.

Raimond L. Winslow et al., "Mechanisms for Altered Excitation-Contraction Coupling in Canine Tachycardia-Induced Heart Failure, II: Model Studies", Circulation Research, vol. 84, pp. 571-586, Mar. 19, 1999.

D. Bers, "Chapter 7: Sarcoplasmic Reticulum Ca Uptake, content and Release", Excitation-Contraction Coupling and Cardiac Contractile Force, 2nd Edition, Kluwer Academic Publishers, Dordrecht, Netherlands, pp. 161-202 (2001).

Yasmin L. Hashambhoy et al., "Role of CaMKII in RyR Leak, EC Coupling and Action Potential Duration: A Computational Model", J. Mol. Cell. Cardiol., vol. 49, No. 4, pp. 617-624, Oct. 2010.

Yasmin L. Hashambhoy et al., "CaMKII-dependent Activation of Late Ina Contributes to Cellular Arrhythmia in a Model of the Cardiac Myocyte", 33rd Annual International Conference of the IEEE EMBS, Boston, MA, Aug. 30-Sep. 3, 2011 (4 pages).

G.D. Smith, "Modeling the Stochastic Gating of Ion Channels", Computational Cell Biology, Springer-Verlag, New York, pp. 285-291 (2002).

Arjun Raj et al., "Single-Molecule Approaches to Stochastic Gene Expression", Annu. Rev. Biophys., vol. 38, pp. 255-270 (2009).

(56) References Cited

OTHER PUBLICATIONS

Ian M. Dobbie et al., "Visualizing Single Molecular Complexes In Vivo Using Advanced Fluorescence Microscopy", Journal of Visualized Experiments, URL:http://www.jove.com/details.php?id=1508 (2009) (3 pages).

Paul J. Choi et al., "A Stochastic Single-Molecule Event Triggers Phenotype Switching of a Bacterial Cell", Science, vol. 322, pp. 442-446, Oct. 17, 2008.

Daniel T. Gillespie, "A General Method for Numerically Simulating the Stochastic Time Evolution of Coupled Chemical Reactions", Journal of Computational Physics, vol. 22, pp. 403-434 (1976).

Yang Cao et al., "Efficient Step Size Selection for the Tau-Leaping Simulation Method", The Journal of Chemical Physics, vol. 124, pp. 044109-1-044109-11 (2006).

Abhijit Chatterjee et al., "Binomial Distribution Based τ-Leap Accelerated Stochastic Simulation", The Journal of Chemical Physics, vol. 122, pp. 024112-1 to 024112-7 (2005).

Tianhai Tian et al., "Binomial Leap Methods for Simulating Stochastic Chemical Kinetics", Journal of Chemical Physics, vol. 121, No. 21, pp. 10356-10364, Dec. 1, 2004.

Daniel T. Gillespie, "Stochastic Simulation of Chemical Kinetics", Annu. Rev. Phys. Chem., vol. 58, pp. 35-55 (2007).

Clara Franzini-Armstrong et al., "Shape, Size, and Distribution of Ca2+ Release Units and Couplons in Skeletal and Cardiac Muscles", Biophysical Journal, vo. 77, pp. 1528-1539, Sep. 1999.

Vien Nguyen et al., "A Stochastic Automata Network Descriptor for Markov Chain Models of Instantaneously Coupled Intracellular Ca2+ Channels", Bulletin of Mathematical Biology, vol. 9, pp. 393-432 (2005).

Peter Buchholz et al., "Kronecker Based Matrix Representations for large Markov Models", Validation of Stochastic Systems, LNCS 2925, pp. 256-295 (2004).

Alan J. Laub, "Matrix Analysis for Scientists and Engineers", Society for Industrial and Aplied Mathematics, Copyright 2005 (87 pages).

Anne Benoit et al., "Memory-Efficient Kronecker Algorithms with Applications to the Modelling of Parallel Systems", Future Generation Computer Systems, vol. 22, pp. 838-847 (2006).

Yousef Saad, "Iterative Methods for Sparse Linear Systems", PWS Publishing Company, Copyright 1996 (464 pages).

Peter Buchholz, "A New Approach Combining Simulation and Randomization for the Analysis of Large Continuous Time Markov Chains", ACM Transactions on Modeling and Computer Simulation, vol. 8, No. 2, pp. 194-222, Apr. 1998.

Peter Buchholz et al., "Complexity of Memory-Efficient Kronecker Operations with Applications to the Solution of Markov Models", INFORMS Journal of Computing, vol. 12, No. 3, pp. 203-222, Summer 2000.

Hilary DeRemigio et al., "Markov Chain Models of Coupled Calcium Channels: Kronecker Representations and Iterative Solution Methods", Physical Biology, vol. 5, pp. 1-14 (2008).

Jeffrey R. Groff et al., "Ryanodine Receptor Allosteric Coupling and the Dynamics of Calcium Sparks", Biophysical Journal, vol. 95, pp. 135-154, Jul. 2008.

William J. Stewart, "Numerical Solution of Markov Chains", Marcel Dekker, Inc., Copyright 1991 (729 pages).

\* cited by examiner

Find number of states of homogeneous cluster

310

Estimate the max number of possible state transitions from one cluster state to another

315

Build compact form matrices

320

Combine compact form matrices.

215

405

Calculate transition rates.

410

Multiply transition rates by time step.

415

Calculate transition probabilities.

220

505

Generate pseudo-random number

510

Calculate cumulative transition probabilities

515

Compare pseudo-random number to cumulative transition probability matrix to determine what transitions, if any, have occurred

METHOD AND SYSTEM FOR UTILIZING MARKOV CHAIN MONTE CARLO SIMULATIONS

CROSS-REFERENCE TO RELATED APPLICATIONS

This application claims priority of U.S. provisional patent application 61/294,194, filed Jan. 12, 2010, the entirety of which is incorporated by reference.

STATEMENT REGARDING FEDERALLY SPONSORED RESEARCH OR DEVELOPMENT

This invention was made with government support under Grant Number 0443843 awarded by National Science Foundation. The government has certain rights in the invention.

BRIEF DESCRIPTION OF FIGURES

FIGS. 2-5 illustrate a method for utilizing a Markov chain Monte Carlo simulation, according to one embodiment.

DESCRIPTION OF EMBODIMENTS OF THE INVENTION

Figure 1:
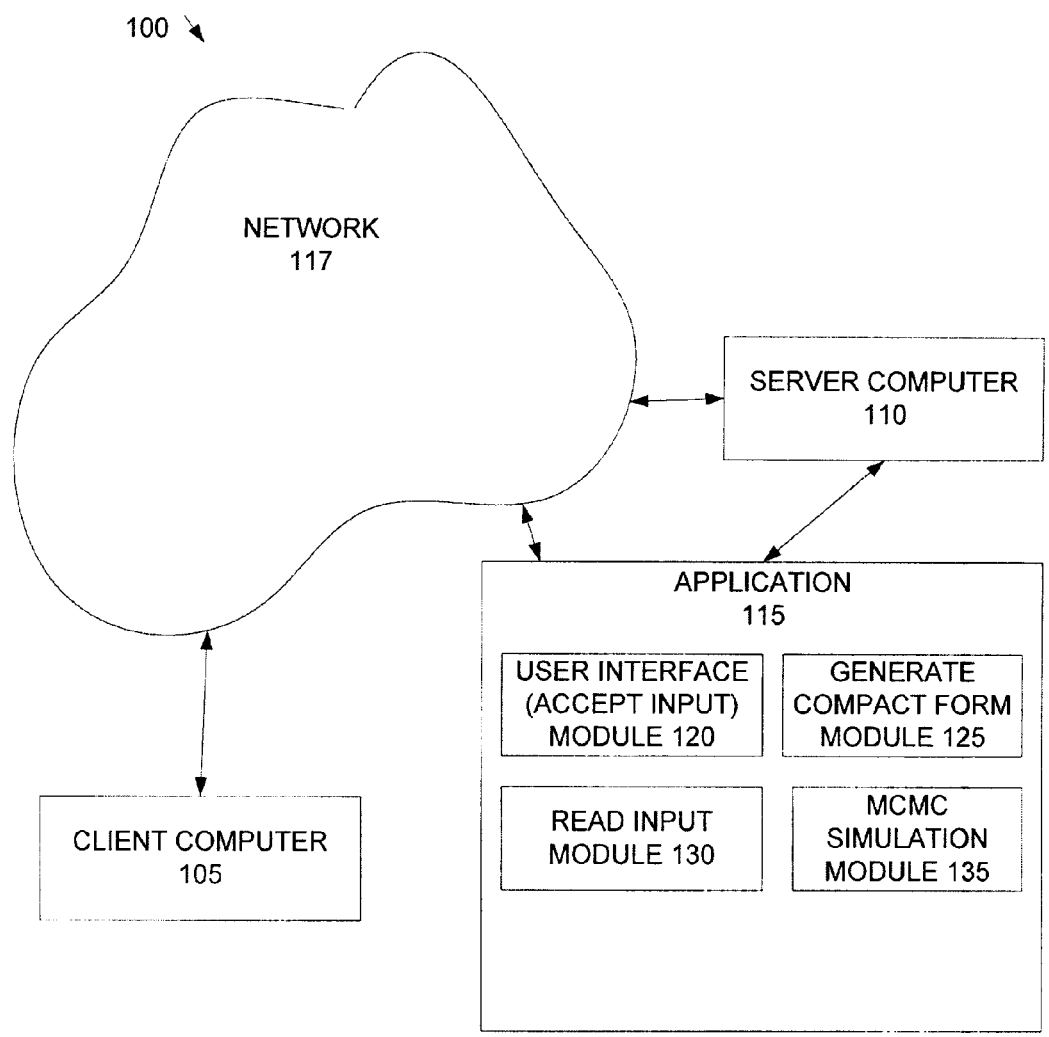
FIG. 1 illustrates a system for utilizing a Markov chain Monte Carlo simulation, according to one embodiment.

In one embodiment, a system and method for utilizing a Markov chain Monte Carlo simulation can be provided. FIG. 1 illustrates a system 100 for utilizing a Markov chain Monte Carlo simulation, according to one embodiment. Markov chain Monte Carlo (MCMC) simulations can be used to describe a stochastic process (e.g., a process that contains a random variable(s)) that can display a Markov Property. A process that displays the Markov property can be a process where the statistical properties of a system's future can be predicted depending only on the current state and not on past states.

Referring to FIG. 1, the system 100 can comprise: a server computer 110, a client computer 105, a network 117, and an application 115. The application 115 can run on a server computer 110 and/or a client computer 105, or be accessible through the network 117. The application 115 can comprise: a user interface module 120; a read input module 130, a generate compact form module 125, or an MCMC simulation module 135, or any combination thereof. The user interface module 120 can accept input from a user. The read input module 130 can read the input. The generate compact form module 125 can generate a compact form of a state space vector and/or a transition probability vector, as described in detail below. The MCMC simulation module 135 can run MCMC simulations, as described in detail below.

In some embodiments, the use of the MCMC simulations can be across many fields, including, but not limited to: social science, economics, chemistry, finance, physics, biology, computer science, or engineering, or any combination thereof. In some embodiments, the MCMC simulations can be used when the probability for transition of the random variables between states does not change during a time step of the algorithm. In other embodiments, the MCMC simulations can also be used when the transition probabilities change with time. In one embodiment, the system and method can improve efficiency by introducing a compact form matrix for the state space—hereafter called a "compact state space matrix"; and can utilize highly efficient approach for working with this state space during the simulation. This can work for either homogeneous or heterogeneous clusters of stochastic units.

For example purpose, the system and method can be applied to the MCMC simulation of calcium ($Ca^{2+}$) channels in the heart (e.g., L-type calcium channel, ryanodine receptor), where the gating of the channels can represent the stochastic unit of the MCMC. Calcium channels are ion channels that can assume different conformational states, such as open states that allow the passage of calcium ions across cellular membranes, and closed states that do not. Ion channels are integral membrane proteins or an assembly of several proteins packed around a water-filled pore.

Ion channels regulate the flow of ions across the membrane in all cells. In some ion channels, passage through the pore is governed by a gate, which may be opened or closed by chemical or electrical signals, temperature, or mechanical force. Ion channels can transit between the open and closed states randomly and can be described by a continuous-time discrete-state Markov chain. Transmembrane ion channels are pore-forming proteins that help establish and control the small voltage gradient across the plasma membrane of cells by allowing the flow of ions down their electrochemical gradient.

It should be noted that the example provided throughout the application is only one of many uses of the system and method. The system and method can be used in a multitude of other examples across many fields, including, but not limited to: social science, economics, chemistry, finance, physics, biology, computer science, or engineering, or any combination thereof.

Figure 2:
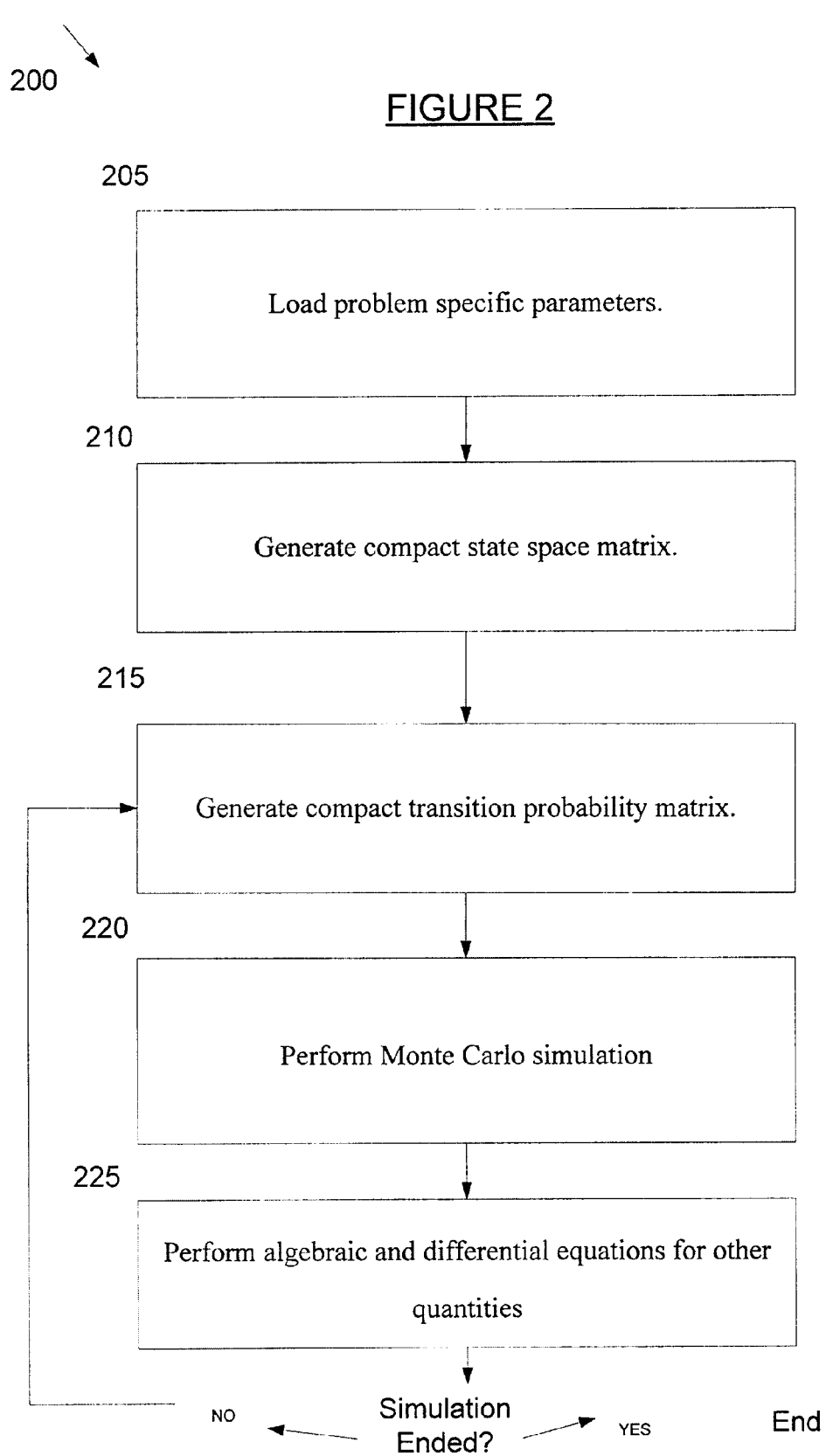

FIG. 2 illustrates a method 200 for utilizing a Markov chain Monte Carlo simulation, according to one embodiment. In 205, problem specific parameters (e.g., transition rates of Markov-chain models of different types of stochastic units, initial states of the system) can be loaded. The transition rates for a Markov-chain model, mathematically, can be represented as an infinitesimal generator matrix, which can be referred to as a $Q_m$-matrix. This $Q_m$-matrix can contain the information about the number of states of a single stochastic units and transition rates from one state to another. Based on the conservation law, the row sum of this matrix can be zero.

For simplicity, we describe the gating of ion channels calculated using a two-state Ryanodine Receptor (RyR) model. The two-state RyR model can correspond to a channel with conductance levels (e.g., closed C and open O):

$$C \underset{k_{21}^-}{\overset{k_{12}^+ c^\eta}{\rightleftarrows}} O \qquad \text{(Equation 1)}$$

where $k_{12}$ and $k_{21}$ can be the rates of the C to O and O to C transitions and can be estimated from experimental data; and the concentration of $Ca^{2+}$ binding experienced by the channel can be given by c, where $\eta$ can indicate the cooperativity of $Ca^{2+}$ binding. In this case, the $Q_m$-matrix can take the form:

$$Q = K_- + c^\eta K_+ = \begin{pmatrix} 0 & 0 \\ k_{21}^- & -k_{21}^- \end{pmatrix} + c^\eta \begin{pmatrix} -k_{12}^+ & k_{12}^+ \\ 0 & 0 \end{pmatrix} \qquad \text{(Equation 2)}$$

Note that the matrices $K_-$ and $K_+$ can be constructed from dissociation and association rate constants, respectively, and can have negative diagonal elements and row sum zero.

When the transition rates do not vary with time, and are independent of calcium, the Q-matrix can take the form:

$$Q = \begin{pmatrix} -k_{12}^+ & k_{12}^+ \\ k_{21}^- & -k_{21}^- \end{pmatrix} \quad \text{(Equation 3)}$$

It should be noted that rates in the state transition diagram (e.g., Equation 1) and the off-diagonal elements of the Q-matrix (e.g., Equation 3) can give the transition rate from state i to state j (i≠j) as follows:

$$Q_{ij} = \lim_{\Delta t \to 0} \frac{P\{S(t+\Delta t) = S_i \mid S(t) = S_i\}}{\Delta t} \quad \text{(Equation 4)}$$

where P can be the transition probability to a particular next state given the current state, S can be the state, and t can be the time. So, when the time step $\Delta t$ is small enough, $Q_{ij}\Delta t$ can become the probability of jumping to state $S_j$ given the current state is $S_i$. This idea can also be extended to either a homogeneous or a heterogeneous cluster of channels as well. The transition rate matrix Q for the cluster can be built, based on the matrix Q for the single stochastic unit, as described below.

Similarly, the absolute values of the diagonal elements of the diagonal elements of the Q-matrix (e.g., Equation 3) can correspond to the probability per unit time that the state remains unchanged.

It should be noted that many other systems can be utilized in some embodiments. In addition, it should be noted that, in some embodiments, Markov chain models of RyRs (and/or other systems) can be more complex than shown in the equations above, and can include multiple closed and/or open states; and/or transitions that reflect experimentally observed phenomena such as voltage- and/or ligand-dependent gating. In other embodiments, for example, this method can be applied to Monte Carlo Simulation for risks that are commonly used in finance.

In a particular system, it typically contains a number of such stochastic units (e.g. RyR channel, LCC), forming a homogeneous cluster or heterogeneous cluster.

We introduce how a compact state space matrix of a heterogeneous cluster can be built, e.g., a $Ca^{2+}$ release unit (CRU) comprising 50 stochastic Ryanodine Receptors (RyRs) co-localized with a number of stochastic voltage-gated L-type $Ca^{2+}$ channels (LCCs) in the diad, such that the ratio of LCC:RyR is between 1:7 depending on the species. In many studies, when the LCCs are pharmacologically disabled; the diad becomes a homogeneous cluster of RyRs only. This approach can be easily extended when we have three or more heterogeneous clusters forming a bigger heterogeneous cluster. Accordingly, we will have distinct concepts: channel state, (homogeneous) cluster state, and CRU (or non-homogeneous cluster) state. The capability of simulating a cardiac cell with a high number of CRUs, i.e. 20,000, demonstrates the power of the method for simultaneously running of multiple instances of a dynamics system.

Referring again to FIG. 2, in 210, a compact transition rate matrix for the cluster can be generated without needing to build the full state transition rate matrix of the cluster. This can be helpful as in certain systems, it may not be possible to build the full transition rate matrix. The first step in building the compact transition rate matrix is defining and calculating the cluster state. We first introduce how to deal with a homogeneous cluster, (i.e. the individual stochastic units are interchangeable). In particular, a reduced state space can be introduced (e.g., the number of possible states from which transitions have to be calculated)—whose individual state of the homogeneous cluster is called a "cluster state". For example, for a CRU with n=50 RyR channels, each represented using m=2 states, the Markov chain of the CRU can be defined as containing $2^{50}$ (ma) or $\sim 10^{15}$ states. However, this state space can be contracted by considering the individual channels to be indistinguishable and only tracking the number of channels in each state. Such a reduced model can have M=(m+n−1)!/(n!(m−1)!) states (e.g., 51 states if n=50 and. m=2). This can be analogous to the combinatorics problem of n balls placed in m bins. The possible configurations of the cluster state can be enumerated in a M×m collector matrix form. For example, for a cluster of three two-state RyR channels (n=3, m=2), the collector matrix $S_r$ can be:

$$S_r = \begin{pmatrix} 3 & 0 \\ 2 & 1 \\ 1 & 2 \\ 0 & 3 \end{pmatrix} \quad \text{(Equation 5)}$$

The columns in $S_r$ can reference the states of the individual channel (e.g., the first column is the number of channels in the closed state and the second column is the number of channels in the open state). The rows can reference the different configurations and can represent the cluster state. For example, the entries in the second row of $S_r$ can indicate that this configuration contains two channels in the closed state and one channel in the open state. Hence, rather than check each channel individually to see if there is a state transition, the matrix $S_r$ can be used to reduce the state space. Thus, it's not the state of each channel that matters, but the number of channels in a particular state.

FIG. 3 sets forth the details of 210. In 305, the detection of the number of states M of a homogeneous cluster can be done. For a homogeneous cluster of M cluster states, it needs a M×M transition rate matrix (or $Q_{hc}$-matrix) to keep the transition rates from each cluster state to another, while the actual number of possible outgoing paths from one particular state can be much smaller than M. The upper bound $\tilde{M}$ of maximum number of possible state transitions can be detected and only the matrix of size M×$\tilde{M}$ is required. This compact transition rate matrix can be used to calculate the transition probabilities from the current state to all of its possible next states of each release site during the MCMC simulation (to be described in detail later).

Instead of finding the total number of possible state transition for all affecting factors (e.g. Ca-dependent, Ca-independent), we can examine only the possible state transitions under individual affecting factors per se. In other words, rather than working with the Q-matrix whose elements involve different factors, as shown in Equation 2, we can deal with the component matrices, e.g. $K_+$, $K_-$. From these matrices, we can build a number of compact form matrices for the clusters. In 310, the maximum number of possible state transitions $\tilde{M}_i$ from one (homogeneous) cluster state to another, under a particular affecting factor, can be estimated (the detail is given in the example in the end). This value can be limited by the Markov-chain size of a single stochastic unit, not the size of the cluster. So, the larger the size the cluster, the more effective our algorithm can be. When the number of stochastic units $n_{su}$ in the cluster is smaller than the number of state $n_{st}$ of a single stochastic unit, a better upper bound value can be the number of off-diagonal non-zero elements from the $n_{su}$ rows of maximum number of off-diagonal non-zero elements. In essence, the upper bound can be the number of off-diagonal non-zero elements from min($n_{su}$,$n_{si}$) rows of maximum number of off-diagonal non-zero elements. For example: if we examine Ca-dependent transitions, and the component matrix for a single stochastic unit is $$K_+ = \begin{bmatrix} -1 & 0.1 & 0.9 \\ 2 & -10 & 8 \\ 1 & 0 & -1 \end{bmatrix}$$

and $n_{su}$=2, $n_{si}$=3, the maximum number of possible state transition of the cluster is 4.

After building the configurations of cluster states, in 310, we can estimate the maximum number of possible state transition from one cluster state to another. One assumption can be that a state transition is valid only when one stochastic unit changes the state within a small enough time step. In our example of a three two-state cluster, a cluster state with the configuration of (3,0) has only one possible next state, which is (2,1). And the cluster state of (2,1), in turn, can have two possible next states, i.e. (3,0) or (1,2). In our example, this assumption is valid 94% of the time. This number can be increased by choosing a smaller adaptive time step. Hence, this assumption doesn't limit the power of the method but confirms that the simulation technique is an exact method as it captures individual channel state transitions. This can reflect a more realistic behavior of the system.

Given the number of cluster states M, and the upper bound for possible state transition for each component matrix $\tilde{M}_i$, we can build the corresponding compact form matrix of size M×$\tilde{M}_i$. This can involve creating two compact form matrices and re-ordering the positions of columns. This can correspond to 315 in FIG. 3.

For each component matrix, say $K_+$, we can use two compact form matrices, one to keep the non-zero state transition, say comp$K_+$, and the other one to keep the state index, say idx$K_+$, that can specify where the non zero element was in the component matrix. As the number of possible state transition is normally a few orders of value smaller than the cluster state size, the two compact-form matrices can achieve a large memory savings. During the process of building this compact form matrix, all diagonal elements can be re-ordered to locate in the first column of the compact form matrix. By doing this, we can greatly reduce the number of comparisons when we perform the Monte-Carlo simulation because the selection of our time step can guarantee that a state transition occurs only 10% of the time (as discussed below). In other words, we can avoid unnecessary computations with this proposed data structure. The first three steps in FIG. 4 can be repeatedly used to build all component matrices.

When the problem domain involves a heterogeneous cluster, we can repeat the process above to build the compact form for the component matrices in each homogeneous cluster. We can also combine the rate transition matrices of the homogeneous clusters into the rate transition matrices of the heterogeneous one.

With respect to the above calcium channel gating in the heart example, calcium release sites can comprise both LCCs and RyRs, which can interact via $Ca^{2+}$ in the dyadic space. So a release unit has two types of homogeneous clusters: RyRs and LCCs. When we use full-form matrices, we can perform the Kronecker sum on these two matrices to find the transition-rate Q-matrix for the heterogeneous cluster. For example, the following can form a Q-matrix representing the states of a release unit containing both LCCs (A) and RyRs (B), $I^A$ and $I^B$ can be identity matrices congruent with $K^A$ and $K^B$, respectively, as shown below:

$$Q^{AB} = K_-^{AB} + c'' K_+^{AB}$$

where $$K_-^{AB} = K_-^A \otimes I_-^B + I_-^A \otimes K_-^B$$

$$K_+^{AB} = K_+^A \otimes I_+^B + I_+^A \otimes K_+^B \quad \text{(Equation 6)}$$

with $K_-^{AB}$, $K_+^{AB}$ conceptually denoted as $K^{AB}$ for further demonstration of the method.

$$K^{AB} = K^A \oplus K^B = K^A \otimes I + I \otimes K^B \quad \text{(Equation 7)}$$

and $K^A$, $K^B$ can be rate transition matrices for the homogeneous cluster. Its compact form versions are comp$K^A$, comp$K^B$ whose building process has been mentioned above.

With the proposed compact form format, we no longer need to do this, i.e. we generate comp$K^{AB}$. It should be noted that with the Kronecker sum, the elements of $K^A$ and the elements of $K^B$ will never fall into the same (row, column) in the $K^{AB}$ matrix, except the diagonal elements. It should also be noted that, using our proposed compact form matrices, all diagonal elements of $K^A$, $K^B$, are now in the first column of its corresponding compact form. So, the compact form comp$K^A$, comp$K^B$, along with idx$K^A$, idx$K^B$, can be easily incorporated to form comp$K^{AB}$, idx$K^{AB}$, when needed via the so-called "compact-Kronecker-product"

$$\text{comp}K_-^{AB} = \text{comp}K^A \otimes I \text{idx}K_-^{AB} = f(\text{idx}K^A)$$

$$\text{comp}K_+^{AB} = I \otimes \text{comp}K^B \text{idx}K_+^{AB} = g(\text{idx}K^B) \quad \text{(Equation 8)}$$

Then $$\text{comp}Q = [T|a_1 \times \text{comp}K_-^{AB}(2:)|a_2 \times \text{comp}K_+^{AB}(2:)]$$

$$\text{idx}Q^{AB} = [\_|\text{idx}K_-^{AB}|\text{idx}K_+^{AB}] \quad \text{(Equation 9)}$$

where T can be the column-vector that contains the diagonal-elements of comp$K^{AB}$, $a_1$, $a_2$ are problem domain-dependent. In our example: $a_1$=1, $a_2$=$c''$. T can be computed based on the first column of comp$K_-^{AB}$, comp$K_+^{AB}$ and the formulation can be $$T = a_1 \times \text{comp}K_-^{AB}(1) + a_2 \times \text{comp}K_+^{AB}(1) \quad \text{(Equation 10)}$$

Using this approach, it can be easily stacked up to form bigger compact form matrices, if the heterogeneous cluster has three or more homogeneous clusters. Finally, we can obtain the compact form of the transition rate Q-matrix. From now on, we'll work with the so-called "master cluster", regardless of whether it's a homogeneous one or heterogeneous one.

In the next step, a timing loop can be performed to simulate the system. In the beginning of the simulation, the initial state of all "master clusters" (or release sites, in our example) can be given in a vector S. The values of this vector can be continuously updated to reflect the current state of the system during the MCMC simulation. The details of the simulation steps are given below. In general, we need to estimate the probability of an outgoing path from the current to all possible states; and a pseudo-random number can be used to determine the next states. This pseudo-random number can be regenerated after every time step.

Referring again to FIG. 2, in 215 a compact transition probability vector (matrix) can be generated, which can contain only possible transitions from one master cluster state to another. If, in the problem domain, it has more than one master clusters or if we want to run many trials of a MCMC study, we can achieve this aim easily by generating a compact transition probability matrix. This is the case in our chosen example, where in a single cardiac cell, it has about 20,000 calcium-release units. The compact transition probability vector (matrix) can be for individual stochastic entities and can use compact form based calculations.

Figure 4:
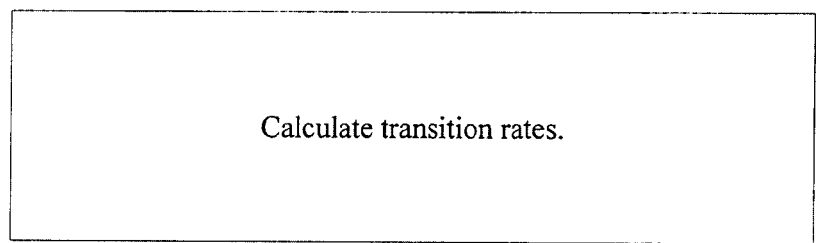
Figure 4:
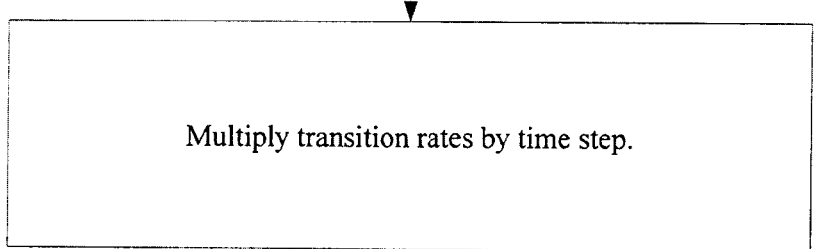
Figure 4:
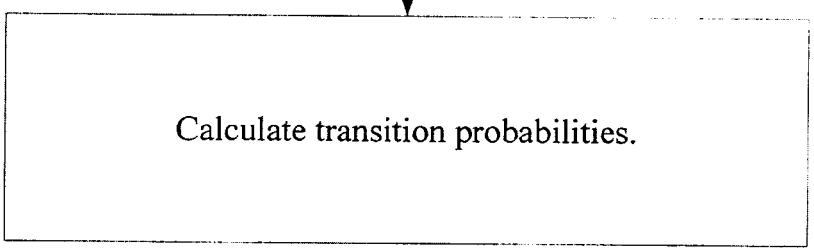

As pointed out in the early part of the algorithm, the transition probability can be computed from the transition rate values when multiplied with the small time step. This time step can be fixed, or adaptively chosen depending on the problem domains. The detailed steps are depicted in FIG. 4.

In 405, transition rates for the current state of the master cluster can be calculated using Equation 10, using information about the current state contained in the compact current state vector. Depending on the problem domain, we can have more terms and the multiplication factor can be different. In our example problem, we can have matrices of calcium-dependent activation, calcium-dependent inactivation, Voltage-dependent activation, or an inactivation matrix; each one can contribute a different factor to the compact form Q-matrix.

In 410, the transition rates can be multiplied by an appropriate time step $\Delta t$. This can be done to convert the transition rates into transition probabilities for use in the Monte Carlo simulation. For numerical stability and computational efficiency, an adaptive time step can be used by constraining the time step $\Delta t$ to the maximum possible value, which can still give a 90% probability of remaining in the current state, $\Delta t = \min(-0.1/q_{min})$, where is $q_{min}$ the negative values in the transition matrix of the master cluster. If the application domain is composed of a number of master clusters, as we explained previously in the cardiac cell model, $q_{min}$ is the smallest negative value from all transition matrices of all master clusters. This minimum value can be easily detected as, in our proposed compact form, the negative values are kept at the first column. It should be noted that the upper bound of $\Delta t$ can be constrained to a value which satisfies numerical stability for any other ordinary differential equations (ODEs) in the calculation. This optimized adaptive time step can lead to increased computational efficiency.

In 415, the transition probabilities are calculated by multiplying the time step with the transition rates.

Figure 5:
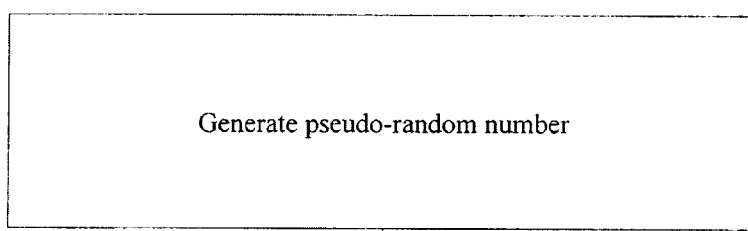
Figure 5:
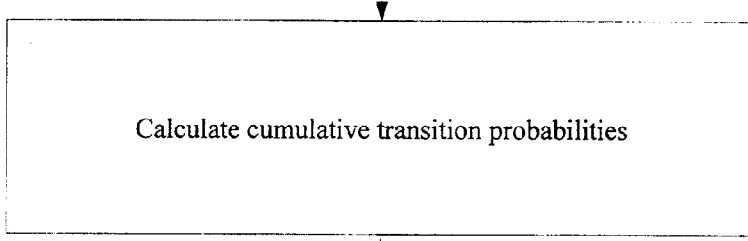
Figure 5:
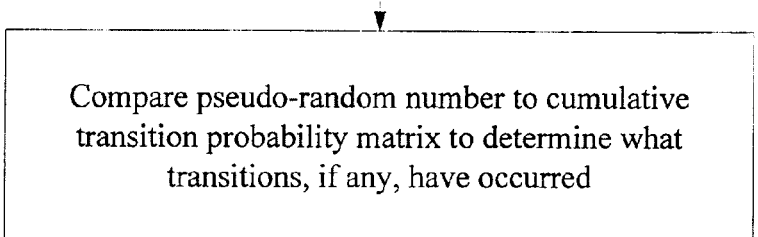

In 220, Monte Carlo simulation can be performed to determine the new state(s) of the master cluster(s). FIG. 5 explains in detail 220. In order to compute the next state using Monte Carlo simulation, a single pseudo-random number (PRN) can be generated for the master cluster, in 505. If the problem domain has a number of master clusters, we may need to generate a vector of PRNs. However, it should be noted that, using our method, only a single PRN is needed for one master cluster. This is considered computational effective as generating PRN is quite expensive. There are many choices of PRN methods; one widely used option is the Mersenne Twister.

In 515, the random numbers can be compared to the cumulative transition matrix to determine what transition, if any, has occurred. Before that, we need to calculate the cumulative transition matrix, in 510. Notice that as the row sum of the rate transition matrix is 0, to guarantee the row sum is 1, after multiplying the rate transition to the time step, the negative value is summed with 1. Again, as the negative value is at the first column, this can be done instantly without needing to search for the correct index of the negative value in the compact form matrix.

$$P_{ij} = \Delta t \times \text{comp} Q_{i,k} (i=1, \ldots, N_{master})$$

$$P_{i1} = P_{i1} + 1$$

The cumulative sum of the rows of P then can be calculated, as shown below:

$$\hat{P}_{i,j} = \text{scan\_sum}(P_{ij})(i=1, \ldots, N_{master} \text{ and } j=1, \ldots, \tilde{N})$$

with $N_{master}$ is the number of master clusters. This can yield an increasing set of numbers between 0 and 1 that can indicate the boundaries of the partitions. Here, each row of matrix P represents the cumulative sum of the probabilities transitions for each master cluster.

By comparing the entries in P to a vector R (N entries) of U [0, 1] pseudo-random numbers, when $R_i < P_{ij}$, the index j can indicate the new state of the master clusters. Once a transition occurs, no further comparisons are necessary for that master cluster (column of P).

It should be noted that, with the emerging of general-purpose graphical processing units (GPGPU), there have been a number of implementations targeted to Compute-Unified Device Architecture (CUDA) that can effectively generate PRNs with several times faster than when a Central Processing Units (CPU) is used. The method 200 can run efficiently on GPGPU as well as on traditional and forthcoming multi-core and many core CPUs. The matrix P (above) can be created for intermediate use only. Its purpose can be for detecting the new state of a master clusters. So, in one embodiment, we propose a GPU-based approach where we can completely get rid of the process of building this matrix, except we keep the first column to detect the adaptive time step. In particular, a loop can be created, and a Boolean variable can be used to keep track of whether a new state is found, and a scalar variable can keep track of the current cumulative probabilities. This scalar variable can reside in register file, and then can be updated on the fly, and be used to compare with the PRN quickly. This so-called "lazy" approach can only do computation when necessary to detect the next state transition. This can help avoid un-necessary computation, saving memory, reducing high-latency memory access, as well as reserving the hardware execution units for other threads' usage. This can help increase efficiencies as time delay for accessing data in global memory can be 150-200 times slower compared to data residing in on-chip memory, e.g., shared memory or register files. This approach can be applied easily to CPU only based calculations as well.

When new states are found, referring back to FIG. 2, in 225, algebraic and differential equations for other quantities that are used to update the transition matrices can be solved. In 230, a simple comparison is used to determine whether the simulation has ended. If not, the process returns to 215 and repeats. If yes, the process ends.

While various embodiments of the present invention have been described above, it should be understood that they have been presented by way of example, and not limitation. It will be apparent to persons skilled in the relevant art(s) that various changes in the form and detail can be made therein without departing from the spirit and scope of the present invention. Thus, the invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from cursory inspection the nature and essence of the technical disclosure of the application. The Abstract of the Disclosure is not intended to be limiting as to the scope of the present invention in any way.

It should also be noted that the terms "a", "an", "the", "said", etc. signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for determining a probability of changing from one state to another in a stochastic entity, comprising;
   performing processing associated with determining, using the processor, the compact component matrix utilizing characteristic information of the stochastic entity;
   performing processing associated with determining, using the processor, the compact composite component matrix by taking a Kroneker product of the compact component matrix and an identity matrix;
   performing processing associated with determining and placing, using the processor, all current states for the stochastic entity into a state space matrix;
   performing processing associated with determining, using the processor, a Q matrix and/or a transition rate matrix using the compact composite component matrix and basic conditions or variables of the problem domain and/or a compact transition rate matrix; and
   performing processing associated with performing, using the processor, Markov chain Monte Carlo (MCMC) simulation using information from the state space matrix and information from the transition rate matrix to determine the probability of changing from one state to another state in the stochastic entity.

2. The method of claim 1, wherein the current states of the stochastic entity are determined by:
   performing processing associated with determining a probability of transitioning out of a current state to another state; and
   performing processing associated with utilizing the probability of transitioning information to determine the current states of the stochastic entity.

3. The method of claim 1, wherein using indices of non zero entries of the state space matrix ensures that only possible current states are used in a compact state space matrix; and/or using non zero transition rates ensures that only possible current transitions are used in a compact transition rate matrix.

4. The method of claim 1, wherein a transition from one state to another state does not need to be constant.

5. The method of claim 1, wherein transition paths out of each current state are tracked rather than all possible transitions.

6. The method of claim 1, wherein the MCMC simulation scales with increasing size and complexity of the stochastic entity.

7. The method of claim 1, wherein the method performs MCMC simulations of multiple stochastic entities simultaneously.

8. The method of claim 6, wherein the MCMC simulation scales by using memory and computational resources.

9. The method of claim 1, wherein the stochastic entity is in the field of: social science, economics, chemistry, finance, physics, biology, computer science, or engineering, or any combination thereof.

10. The method of claim 1, wherein the MCMC simulation is computed by: a GPGPU, a CPU, any other distributed and/or parallel processor, or any combination thereof.

11. The method of claim 1, wherein the stochastic entity is a cluster of ion channels.

12. A system for determining the probability of changing from one state to another in a stochastic entity, comprising:
    a processor configured for:
    performing processing associated with determining, using the processor, the compact component matrix utilizing characteristic information of the stochastic entity;
    performing processing associated with determining, using the processor, the compact composite component matrix by taking a Kroneker product of the compact component matrix and an identity matrix;
    performing processing associated with determining and placing, using the processor, all current states for the stochastic entity into a state space matrix;
    performing processing associated with determining, using the processor, a Q matrix and/or a transition rate matrix using the compact composite component matrix and basic conditions or variables of the problem domain and/or a compact transition rate matrix; and
    performing processing associated with performing, using the processor, Markov chain Monte Carlo (MCMC) simulation using information from the state space matrix and information front the transition rate matrix to determine the probability of changing from one state to another state in the stochastic entity.

13. The system of claim 12, wherein the current states of the stochastic entity can be determined by:
    performing processing associated with determining a probability of transitioning out of a current state to another state; and
    performing processing associated with utilizing the probability of transitioning information to determine the current states of the stochastic entity.

14. The system of claim 13, wherein using a indices of non zero entries of the state space matrix ensures that only possible current states are used in a compact state space matrix; and/or using non zero transition rates ensures that only possible current transitions are used in a compact transition rate matrix.

15. The system of claim 12, wherein a transition from one state to another state does not need to be constant.

16. The system of claim 12, wherein transition paths out of each current state are tracked rather than all possible transitions.

17. The system of claim 12, wherein the MCMC simulation scales with increasing size and complexity of the stochastic entity.

18. The system of claim 12, wherein the method performs MCMC simulations of multiple stochastic entities simultaneously.

19. The system of claim 17, wherein the MCMC simulation scales by using memory and computational resources.

20. The system of claim 12, wherein the stochastic entity is in the field of: social science, economics, chemistry, finance, physics, biology, computer science, or engineering, or any combination thereof.

21. The system of claim 12, wherein the MCMC simulation is computed by: a GPGPU, a CPU, any other distributed and/or parallel processor, or any combination thereof.

22. The system of claim 12, wherein the stochastic entity is a cluster of ion channels.

23. The method of claim 1, wherein the following are in compact form: state space matrix, transition rate matrix, or Q-matrix, or any combination thereof.

24. The method of claim 1, wherein the transition rate matrix changes based on changing conditions and/or variables of the problem domain.

25. The system of claim 1, wherein the following are in compact form: state space matrix, transition rate matrix, or Q-matrix, or any combination thereof.

26. The system of claim 1, wherein the transition rate matrix changes based on changing conditions and/or variables of the problem domain.

\* \* \* \* \*

UNITED STATES PATENT AND TRADEMARK OFFICE
CERTIFICATE OF CORRECTION

PATENT NO. : 9,009,095 B1  
APPLICATION NO. : 13/005433  
DATED : April 14, 2015  
INVENTOR(S) : Mohsin Saleet Jafri et al.

Page 1 of 1

It is certified that error appears in the above-identified patent and that said Letters Patent is hereby corrected as shown below:

On the Title Page

Item (12)  
Change "Fafri et al." to --Jafri et al.--; and

Item (75) Inventors  
Change "Fafri" to --Jafri--.

Signed and Sealed this  
Fourth Day of August, 2015

Michelle K. Lee  
*Director of the United States Patent and Trademark Office*